United States Patent
Xu et al.

(10) Patent No.: US 12,399,773 B2
(45) Date of Patent: Aug. 26, 2025

(54) END TO END CHECK CODE PROTECTION IN STORAGE ENGINE

(71) Applicant: Alibaba Group Holding Limited, Grand Cayman (KY)

(72) Inventors: Yikang Xu, Redmond, WA (US); Peng Xu, Milpitas, CA (US); Rui Wang, Redmond, WA (US); Yu Du, Hangzhou (CN)

(73) Assignee: Alibaba Group Holding Limited (KY)

( * ) Notice: Subject to any disclaimer, the term of this patent is extended or adjusted under 35 U.S.C. 154(b) by 127 days.

(21) Appl. No.: 18/270,184

(22) PCT Filed: Jan. 22, 2021

(86) PCT No.: PCT/CN2021/073415
§ 371 (c)(1),
(2) Date: Jun. 28, 2023

(87) PCT Pub. No.: WO2022/155928
PCT Pub. Date: Jul. 28, 2022

(65) Prior Publication Data
US 2024/0126641 A1     Apr. 18, 2024

(51) Int. Cl.
*G06F 11/10* (2006.01)
*G06F 11/00* (2006.01)
*H03M 13/00* (2006.01)

(52) U.S. Cl.
CPC .......... *G06F 11/1004* (2013.01); *G06F 11/10* (2013.01)

(58) Field of Classification Search
CPC .. G06F 11/1004; G06F 11/00; G06F 11/1076; H03M 13/00
See application file for complete search history.

(56) References Cited

U.S. PATENT DOCUMENTS 7,809,870 B2 * 10/2010 McDaniel ............. H04L 63/123
714/799
11,825,346 B2 * 11/2023 Kim ..................... H04W 72/21
(Continued)

FOREIGN PATENT DOCUMENTS

CN         108512785 A      12/2020

OTHER PUBLICATIONS

International Search Report mailed Oct. 26, 2021, from PCT/CN2021/073415, 3 pages.
(Continued)

*Primary Examiner* — Justin R Knapp
(74) *Attorney, Agent, or Firm* — Lee & Hayes, P.C.

(57) ABSTRACT

A client device may transmit a data stream including an object (such as a data file or record) to a storage system for storing the object in a storage device. In response to receiving the data stream, the storage system may store or write data of the object into a plurality of logical blocks of the storage device with an end-to-end data protection based at least in part on a comparison of a combination of check codes of a header of the object, the object and padding data with a combination of a plurality of check codes that are generated separately for metadata associated with the object and corresponding parts of the object stored in the plurality of logical blocks. The storage system may further provide an end-to-end data protection for reading data of an object stored in multiple logical blocks of a storage device.

20 Claims, 6 Drawing Sheets

(56) References Cited

U.S. PATENT DOCUMENTS

2011/0004817 A1* 1/2011 Cheong ............... G06F 11/1004
              714/E11.032
2013/0054916 A1  2/2013 Banzhaf et al.
2015/0324573 A1  11/2015 Li et al.

OTHER PUBLICATIONS

Written Opinion mailed Oct. 26, 2021, from PCT/CN2021/073415, 4 pages.

* cited by examiner

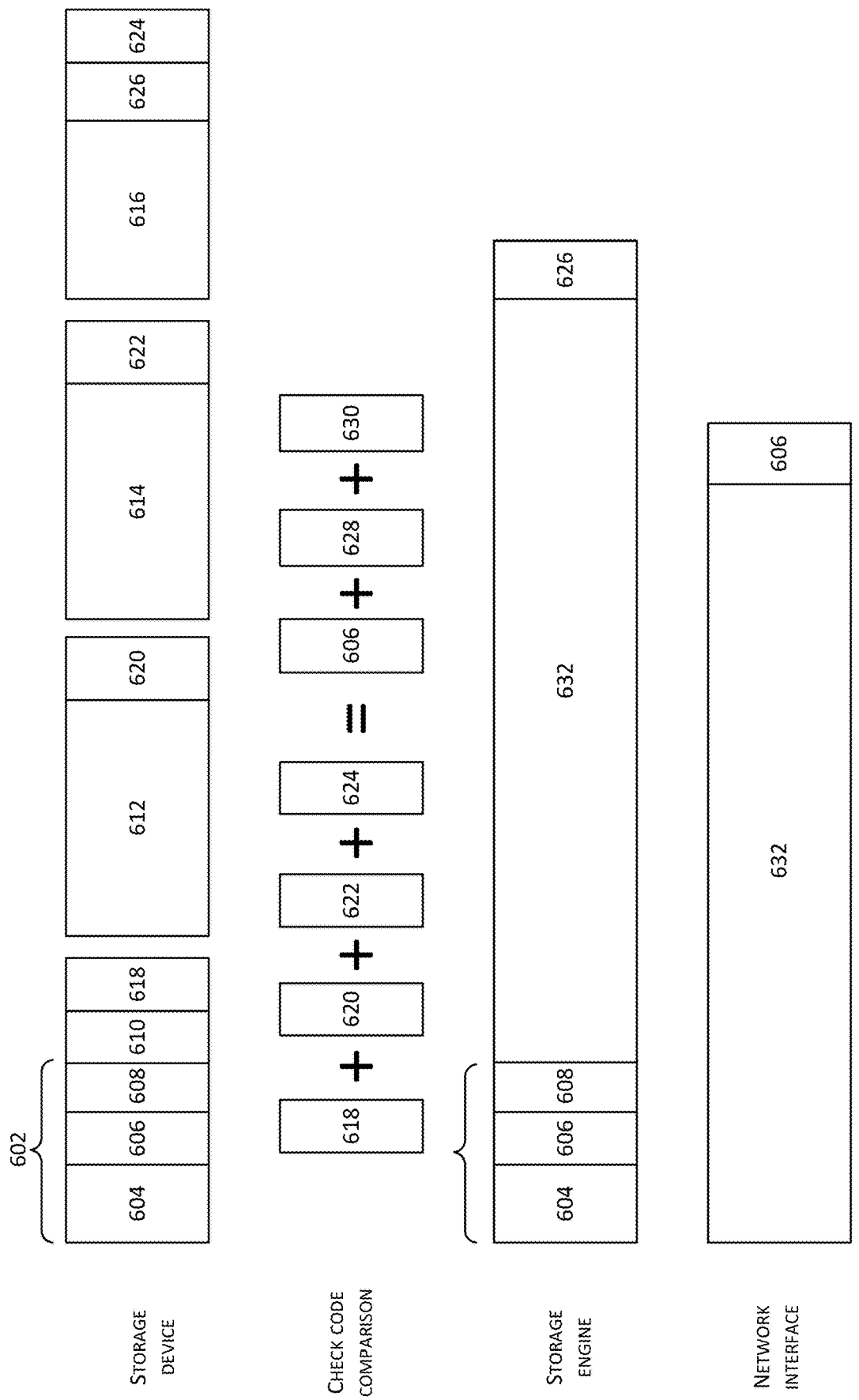

END TO END CHECK CODE PROTECTION IN STORAGE ENGINE

CROSS-REFERENCE TO RELATED PATENT APPLICATIONS

This application claims priority to and is a continuation of PCT Patent Application No. PCT/CN2021/073415 filed on 22 Jan. 2021 and entitled "END TO END CHECK CODE PROTECTION IN STORAGE ENGINE," which is incorporated herein by reference in its entirety.

BACKGROUND

Memory technologies have recently encountered explosive growth. Various types of high-speed, high-performance storage devices have been developed. Examples of these high-speed, high-performance storage devices may include solid state devices (SSDs), NUMA (Non-Uniform Memory Access) devices, NVMe (Non-Volatile Memory Express) devices, etc. These storage devices use logical blocks as units of storage.

When a request for storing an object is received at a computing device having a storage device of the above types of storage devices over a network, the computing device may write data of the object into the storage device. If a size of the data is larger than a size of each logical block of the storage device, the data of the object is divided and written in a plurality of logical blocks of the storage device. After the data of the object is written into the plurality of logical blocks, it is desirable to determine whether the data of the object stored in the storage device is intact as a whole. However, doing so would need to retrieve the entire data of the object from the storage device, calculate a check code for the entire data of the object, and determine whether the stored object is intact based on the calculated check code. This may not only require a consumption of bandwidths associated with a communication line (such as an internal bus) and memory (such as cache) due to the need of transferring the data of the object from the storage device to the memory, but also require the occupancy of one or more processors of the computing device to perform the operations of calculation and determination for the check code. This is especially true when the object is large in size, and covers a large number of logical blocks of the storage device.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

FIG. 6 illustrates an example data read path.

DETAILED DESCRIPTION

Overview

Figure 1:
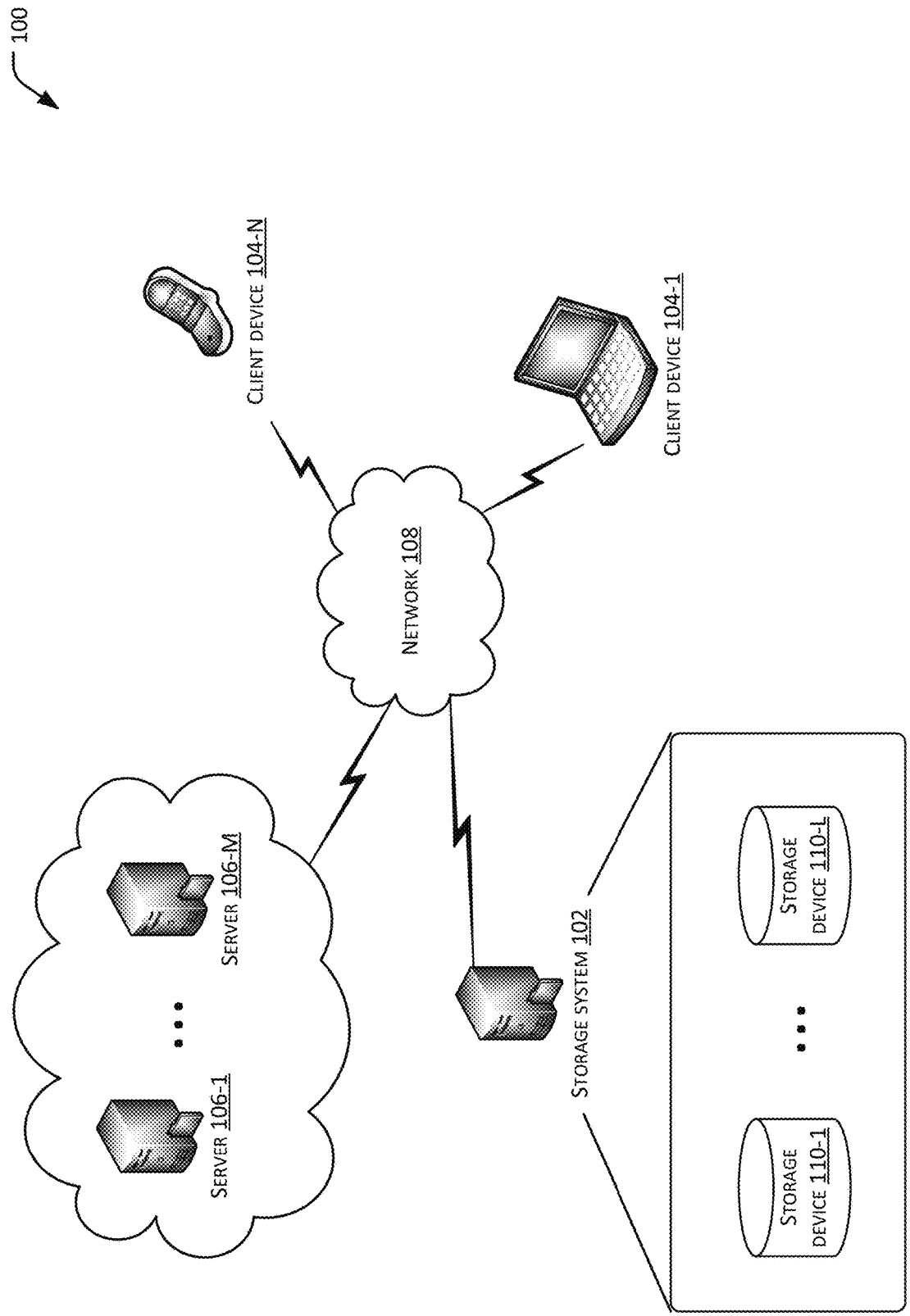
FIG. 1 illustrates an example environment in which a storage system may be used.

As described above, performing the data integrity check of an object written in a storage device may consume the bandwidths associated with a communication line or channel (such as a computer or communication bus, etc.) and memory, but also require the occupancy of processors of a computing device associated with the storage device. This is especially true when the object is large in size, and covers a large number of logical blocks of the storage device.

This disclosure describes an example storage system. In implementations, the storage system may take advantage of features of a network interface (such as a network adapter) and a storage device to perform an end-to-end data protection and a data integrity check of an object written into a storage device without the need of retrieving the entire data of the object from the storage device, thus saving a bandwidth associated with a communication line or channel (such as a computer or communication bus, etc.) between the storage device and memory (such as a cache) and a bandwidth associated with the memory, and further reducing or simplifying the workload on one or more processors of the storage system.

In implementations, the storage system may include a network interface and a storage engine. The storage system may receive a request to store an object from a client device through the network interface of the storage system over a network. In response to receiving the request, the network interface may calculate or generate a check code (e.g., a CRC code or other error detecting code) for data of the object as a whole, and compare the calculated check code with a check code carried in the data of the object (e.g., included in header data of the object, etc.) to determine whether the data of the object is received completely without any data loss or corruption. In response to determining that the data of the object is received completely without any data loss or corruption, the network interface may send the check code generated by the network interface to the storage engine as a confirmation message to indicate that the data of the object is received completely without any data loss or corruption.

In implementations, the storage engine may perform preparation operations (such as calculating a padding size, creating padding data, generating additional check codes, etc.) for the data of the object. After writing the data of the object and other metadata associated with the object into a storage device that is configured to store data in units of logical blocks and generate individual check codes for data stored in corresponding logical blocks, the storage engine may perform data integrity check on the data of the object written in the storage device by retrieving only corresponding check codes generated in the plurality of logical blocks to which the data of the object and the other metadata associated with the object are written to determine whether the data of the object is written successfully without any data corruption. In implementations, the storage engine may compare the retrieved check codes with the check code generated by the network interface and other additional check codes generated by the storage engine to determine the integrity of the data of the object written in the storage device. Based on a comparison result, the storage engine may determine that the data of the object is written successfully into the storage device without any data corruption.

As described above, since only the check codes generated by the storage device for the data of the object written in the plurality of logical blocks, rather than the entire data of the object, are retrieved or obtained, the data integrity check performed by the storage system consumes much less bandwidth associated with a communication line or channel (such as a computer or communication bus, etc.) between the storage device and memory and much less bandwidth associated with the memory. Furthermore, the data integrity check performed by the storage system does not need to re-calculate a check code for the entire data of the object and only needs to reuse already calculated check codes, the storage system therefore places a less burden or workload on one or more processors of the storage system.

Furthermore, functions described herein to be performed by the storage system may be performed by multiple separate services or units. Moreover, although in the examples described herein, the storage system may be implemented as a combination of software and hardware implemented in an individual entity or device, in other examples, the storage system may be implemented and distributed as services provided in one or more computing devices over a network and/or in a cloud computing architecture.

The application describes multiple and varied embodiments and implementations. The following section describes an example framework that is suitable for practicing various implementations. Next, the application describes example systems, devices, and processes for implementing a storage system.

Example Environment

FIG. 1 illustrates an example environment 100 usable to implement a storage system. The environment 100 may include a storage system 102, a plurality of client devices 104-1, . . . , 104-N (which are collectively called as client devices 104), and a plurality of servers 106-1, . . . , 106-M (which are collectively called as servers 106), where N and M are integers greater than or equal to one. The storage system 102, the plurality of client devices 104, and the plurality of servers 106 may communicate data with one another via a network 108.

In this example, the storage system 102 is described to be an individual entity or device. In other instances, the storage system 102 may be located in one of the plurality of client devices 104, or may be located in one of the plurality of servers 106. For example, each client device 104 or each server 106 may individually include the storage system 102. In implementations, the storage system 102 and the plurality of servers 106 may form a data center or cloud computing infrastructure, or may be included in a data center or cloud computing infrastructure.

In implementations, the storage system 102 may be associated with one or more storage devices 110-1, . . . , 110-L (which are collectively called as storage devices 110), where L is an integer greater than or equal to one. In implementations, the one or more storage devices 110 may be included in the storage system 102. Additionally or alternatively, the one or more storage devices 110 may be peripheral and accessible to the storage system 102. The storage system 102 may be enabled or configured to control and/or manage the one or more storage devices 110.

In implementations, each of the plurality of client devices 104 and/or the plurality of servers 106 may be implemented as any of a variety of computing devices, but not limited to, a desktop computer, a notebook or portable computer, a handheld device, a netbook, an Internet appliance, a tablet or slate computer, a mobile device (e.g., a mobile phone, a personal digital assistant, a smart phone, etc.), a server computer, etc., or a combination thereof.

The network 108 may be a wireless or a wired network, or a combination thereof. The network 108 may be a collection of individual networks interconnected with each other and functioning as a single large network (e.g., the Internet or an intranet). Examples of such individual networks include, but are not limited to, telephone networks, cable networks, Local Area Networks (LANs), Wide Area Networks (WANs), and Metropolitan Area Networks (MANS). Further, the individual networks may be wireless or wired networks, or a combination thereof. Wired networks may include an electrical carrier connection (such a communication cable, etc.) and/or an optical carrier or connection (such as an optical fiber connection, etc.). Wireless networks may include, for example, a WiFi network, other radio frequency networks (e.g., Bluetooth®, Zigbee, etc.), etc.

In implementations, a client device 104 may transmit a data stream including an object (such as a data file or record) to the storage system 102 for storing the object in a storage device (such as the storage device 110) controlled and/or managed by the storage system 102. In response to receiving the data stream, the storage system 102 may store or write data of the object into a plurality of logical blocks of the storage device 110 with an end-to-end data protection based at least in part on a comparison of a combination of check codes of a header of the object, the object and padding data with a combination of a plurality of check codes that are separately generated for metadata associated with the object and corresponding parts of the object stored in the plurality of logical blocks.

In implementations, another client device 104 may request an object (such as a data file or record) that is stored in a storage device controlled and/or managed by the storage system 102. In response to receiving the request, the storage system 102 may read data of the object stored in a plurality of logical blocks of a storage device with an end-to-end data protection based at least in part on a comparison of a combination of check codes of a header of the object, the object and padding data with a combination of a plurality of check codes that are separately generated for metadata associated with the object and corresponding parts of the object stored in the plurality of logical blocks.

Example Storage System

Figure 2:
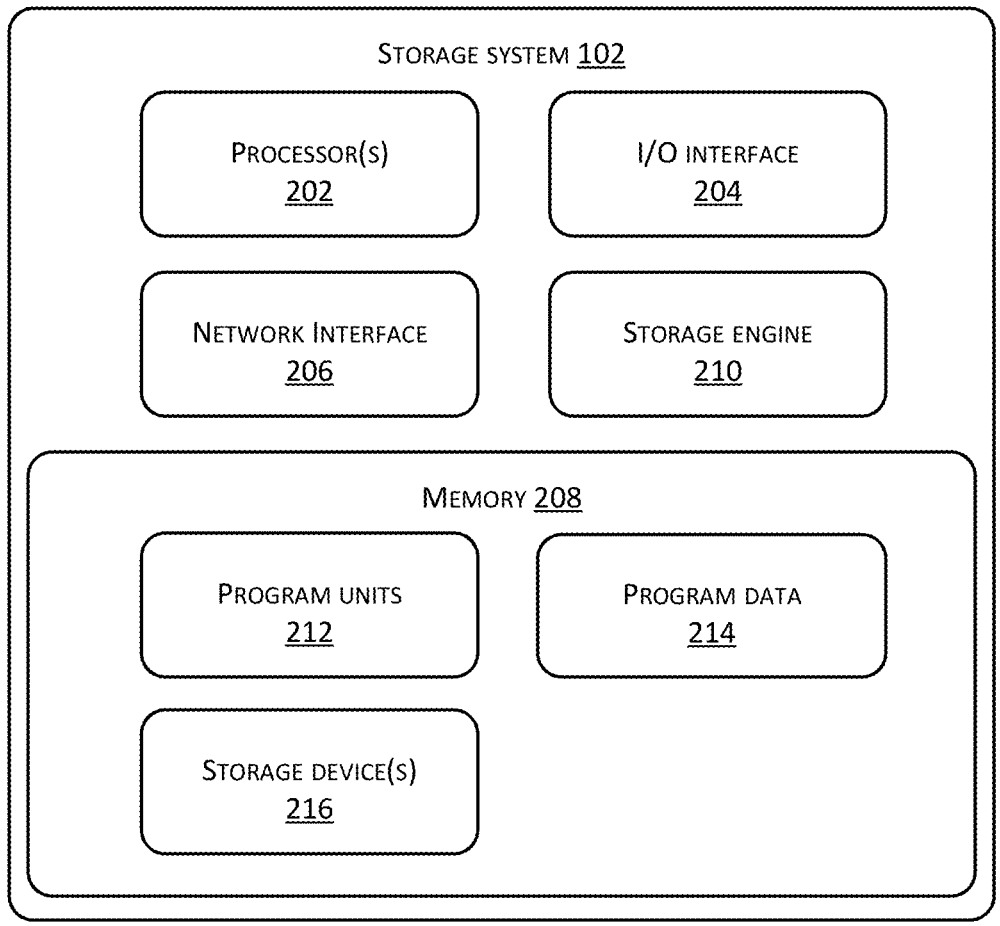
FIG. 2 illustrates the example storage system in more detail.

FIG. 2 illustrates the storage system 102 in more detail. In implementations, the storage system 102 may include, but is not limited to, one or more processors 202, an input/output (I/O) interface 204, and/or a network interface 206, and memory 208. Additionally, in some instances, the storage system 102 may further include a storage engine 210. In implementations, the storage engine 210 may include at least one processor (such as the processor 202) and memory (such as the memory 208). In implementations, some of the functions of the storage system 102 may be implemented using hardware, for example, an ASIC (i.e., Application-Specific Integrated Circuit), a FPGA (i.e., Field-Programmable Gate Array), and/or other hardware.

In implementations, the processors 202 may be configured to execute instructions that are stored in the memory 208, and/or received from the I/O interface 204, and/or the network interface 206. In implementations, the processors 202 may be implemented as one or more hardware processors including, for example, a microprocessor, an application-specific instruction-set processor, a physics processing unit (PPU), a central processing unit (CPU), a graphics processing unit, a digital signal processor, a tensor processing unit, etc. Additionally or alternatively, the functionality described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc.

The memory 208 may include computer readable media in a form of volatile memory, such as Random Access Memory (RAM) and/or non-volatile memory, such as read only memory (ROM) or flash RAM. The memory 208 is an example of computer readable media.

The computer readable media may include a volatile or non-volatile type, a removable or non-removable media, which may achieve storage of information using any method or technology. The information may include a computer readable instruction, a data structure, a program module or other data. Examples of computer readable media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include any transitory media, such as modulated data signals and carrier waves.

In implementations, the network interface 206 may include a network adapter. In implementations, the network adapter may include a smart network adapter that is configured to implement complex networking data plane functions, which include, but are not limited to, multiple match-action processing, tunnel termination and origination, metering and shaping per-low statistics, etc. Additionally or alternatively, the smart network adapter may further be configured to support a fungible data plane through updated firmware loads or customized programming, with little or no predetermined limitations on functions that can be performed. Additionally or alternatively, the smart network adapter may be configured to work seamlessly with existing open source ecosystems to maximize software feature velocity and leverage. Additionally or alternatively, the smart network adapter may be configured to offload basic algorithms for cloud computing, which may include, but are not limited to, an error-detecting code generation and check (such as CRC (cyclic redundancy check) generation and check, etc.), data compression, data encryption and decryption, etc.

By way of example and not limitation, in an object-based storage, data of an object may be managed as a single unit. When data of an object is received at the network interface 206 of the storage system 102 from a client device (such as the client device 104) over the network 106, the network interface 206 may generate a check code (such as a CRC code or other error detecting code) for the entire data of the object.

For example, the network interface 206 may calculate a check code continuously while receiving a data stream associated with the object from the client device 104, and output a final check code after the entire data stream associated with the object (i.e., the entire data associated with the object) is received from the client device 104. The network interface 206 may compare the final check code with a check code included in the data stream of the object (e.g., included in header data of the data stream or the object). Upon verifying that the final check code is the same as the check code included in the data stream of the object, the network interface may determine that the data of the object is received completely without any data loss or corruption. The network interface 206 may then send the final check code to the storage engine 210 as a confirmation message to indicate that the data of the object is received completely without any data loss or corruption. The final check code may be used by the storage system 102 or the storage engine 210 for subsequent data integrity check (such as check code comparison as described in later sections) of the object.

Although in this example, only hardware components are described in the storage system 102, in other instances, the storage system 102 may further include other hardware components and/or other software components such as program units 212 to execute instructions stored in the memory 208 for performing various operations, and program data 214 that stores application data and data of tasks processed by the storage system 102. In implementations, one or more storage devices 216 may be associated with the storage system 102. In implementations, the one or more storage devices 216 may be included in the storage system 102. Additionally or alternatively, the one or more storage devices 216 may be peripheral and accessible to the storage system 102. In implementations, the one or more storage devices 216 may be controlled and/or managed by the storage system 102.

Example Methods

Figure 3:
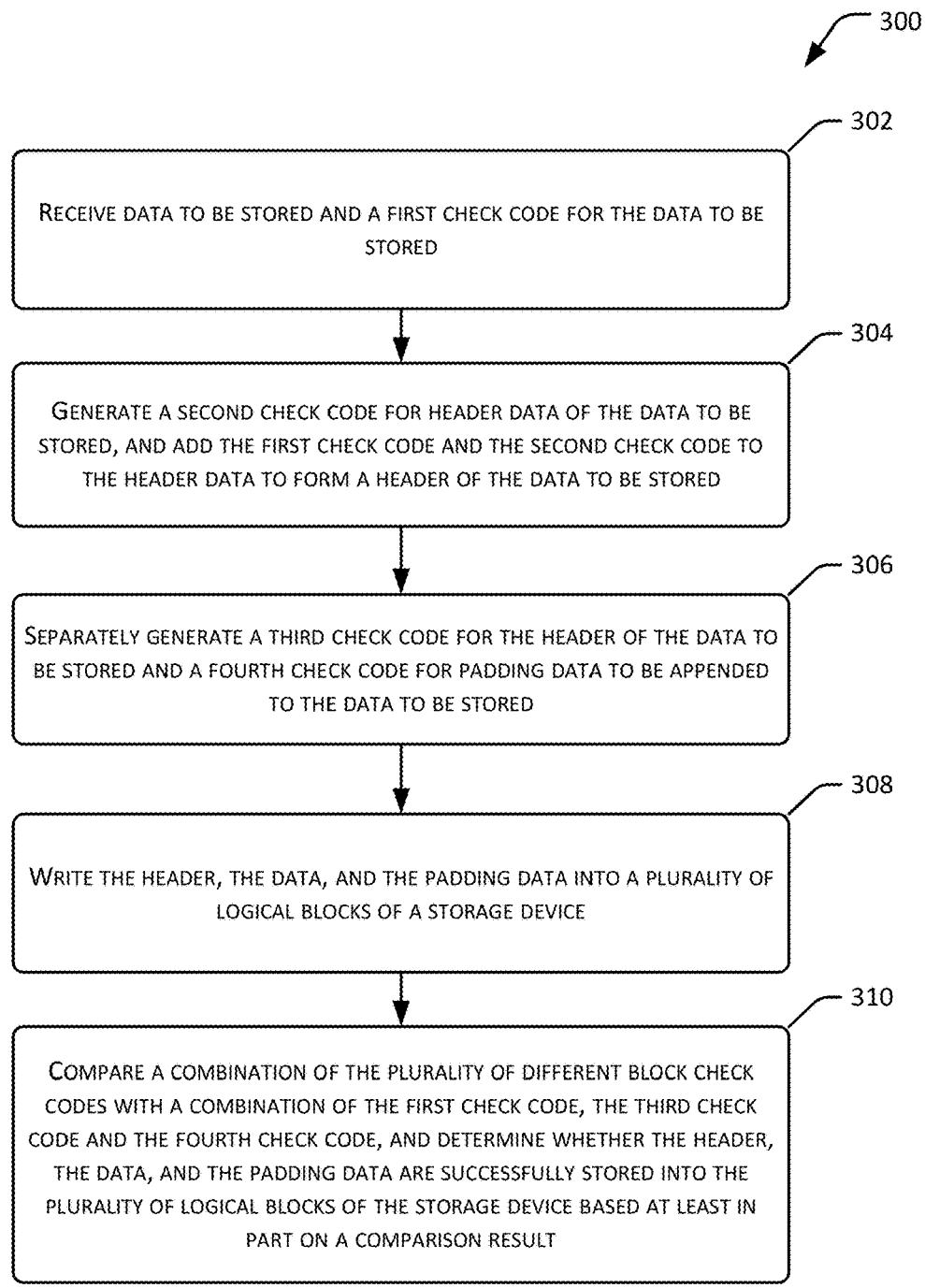
FIG. 3 illustrates an example data writing method.
Figure 5:
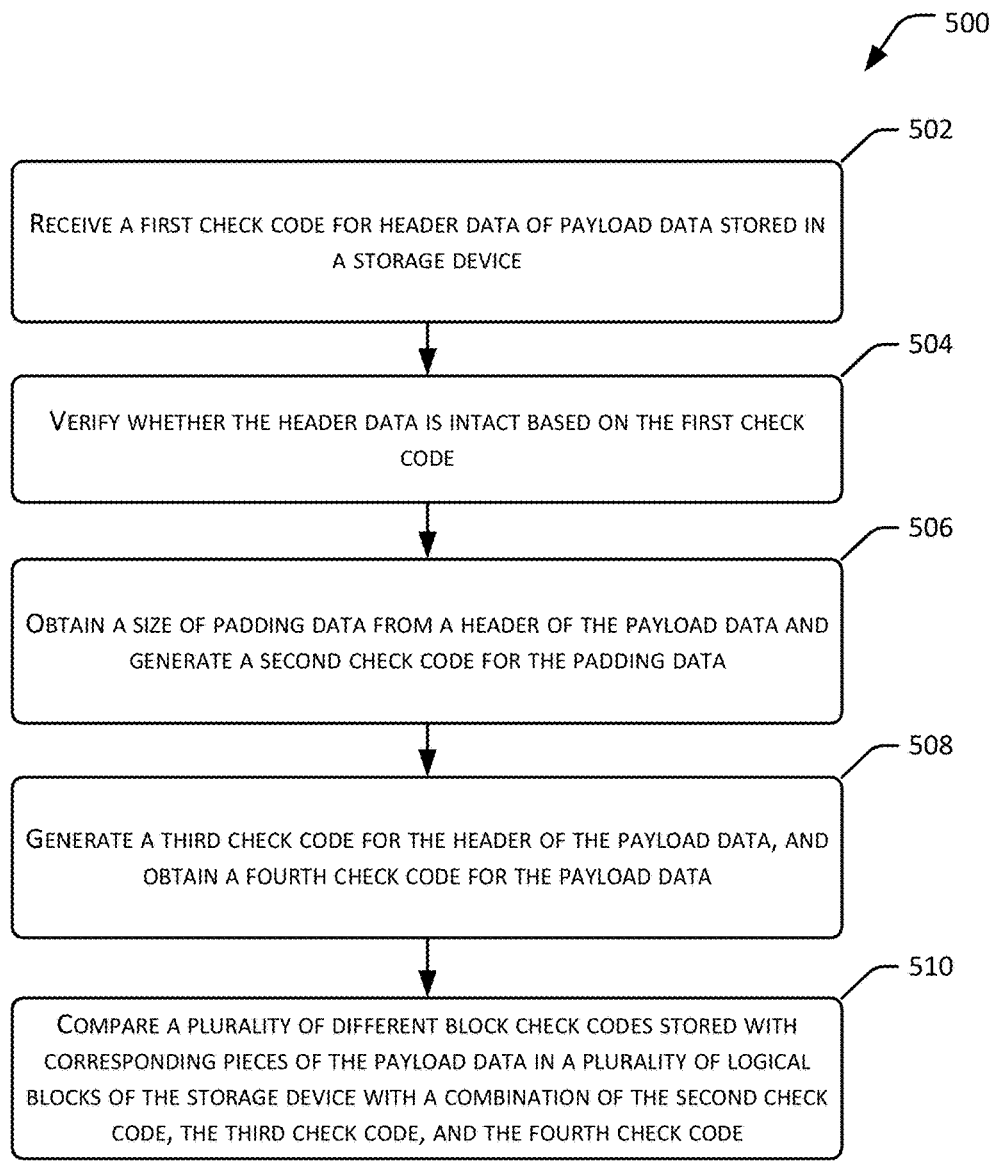
FIG. 5 illustrates an example data reading method.

FIG. 3 illustrates a schematic diagram depicting an example data writing method. FIG. 5 illustrates a schematic diagram depicting an example data reading method. The methods of FIGS. 3 and 5 may, but need not, be implemented in the environment of FIG. 1 and using the system of FIG. 2. For ease of explanation, methods 300 and 500 are described with reference to FIGS. 1 and 2. However, the methods 300 and 500 may alternatively be implemented in other environments and/or using other systems.

The methods 300 and 500 are described in the general context of computer-executable instructions. Generally, computer-executable instructions can include routines, programs, objects, components, data structures, procedures, modules, functions, and the like that perform particular functions or implement particular abstract data types. Furthermore, each of the example methods are illustrated as a collection of blocks in a logical flow graph representing a sequence of operations that can be implemented in hardware, software, firmware, or a combination thereof. The order in which the method is described is not intended to be construed as a limitation, and any number of the described method blocks can be combined in any order to implement the method, or alternate methods. Additionally, individual blocks may be omitted from the method without departing from the spirit and scope of the subject matter described herein. In the context of software, the blocks represent computer instructions that, when executed by one or more processors, perform the recited operations. In the context of hardware, some or all of the blocks may represent application specific integrated circuits (ASICs) or other physical components that perform the recited operations.

Referring back to FIG. 3, at block 302, the storage system 102 may receive data to be stored and a first check code for the data to be stored.

In implementations, the storage system 102 may receive a data stream or data to be stored (which is called as payload data for distinction from other data that will be described hereinafter) from a client device (such as the client device 104). In implementations, the payload data may include data of an object (such as a data file or record). In implementations, the storage system 102 may further receive metadata information (such as header data) of the payload data from the client device 104. The metadata information of the data may include, but is not limited to, a size of the payload data (such as a data size (e.g., a number of bytes or a bit size, etc.) of the object), a check code or error-detecting code (or called as a first check code), and other information associated with the payload data. In implementations, the check code or error-detecting code may include, but is not limited to a CRC code, etc.

In implementations, the storage system 102 may receive the payload data (i.e., the data to be stored) from the client device 104 through the network interface 206 (such as a smart network adapter) of the storage system 102. In implementations, the network interface 206 may be configured to determine the integrity of the payload data received from the client device 104.

Figure 4:
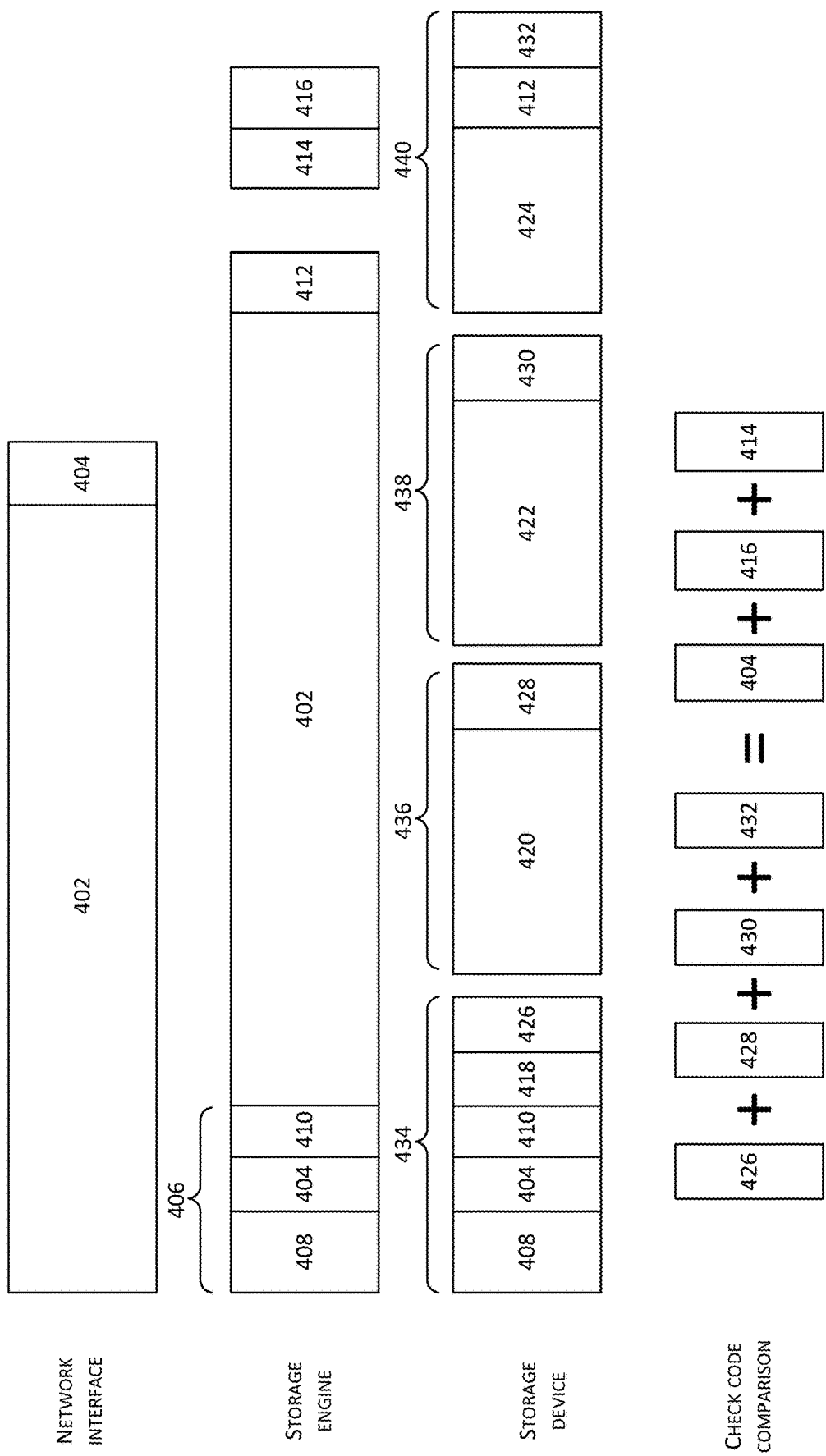
FIG. 4 illustrates an example data write path.

By way of example and not limitation, the network interface 206 may be configured to calculate or generate a check code (such as a CRC code) based at least in part on the payload data received by the network interface 206 using a same error-detecting algorithm that is used for generating the check code included in the metadata information of the payload data. For example, the storage system 102 (or the network interface 206) and the client device 104 may have agreed to use a first check code generation method (such as a CRC generation method) with specific parameter(s) before the payload data is transmitted from the client device 104 to the storage system 102 (or the network interface 206). In implementations, the network interface 206 may calculate or generate a check code continuously while receiving the data stream or the payload data associated with the object from the client device 104, and output a final check code after the entire data stream or the payload data associated with the object (i.e., the entire data associated with the object) is received from the client device 104. FIG. 4 shows example data components received and/or generated at the network interface 206. In this example, the data received and/or generated at the network interface 206 may include payload data 402 and a payload check code 404 (i.e., the first check code) for the payload data.

In implementations, the network interface 206 may further be configured to compare the check code calculated by the network interface 206 with the check code included in the metadata information of the payload data, and determine whether the payload data received from the client device 104 is intact and not corrupted during transmission based on a comparison result. For example, the network interface 206 may determine that the payload data received from the client device 104 is intact without any data loss or corruption during transmission in response to the comparison result indicating that the check code calculated by the network interface 206 is identical to the check code included in the metadata information of the payload data. Alternatively, if the comparison result indicates that the check code calculated by the network interface 206 is not identical to the check code included in the metadata information of the payload data, the network interface 206 may determine that the payload data received from the client device 104 is not intact and is corrupted.

In implementations, if determining that the payload data received from the client device 104 is intact and not corrupted, the network interface 206 may send a message indicating that the payload data is intact to the storage engine 210 of the storage system 102. Additionally or alternatively, the network interface 206 may then send the check code calculated or generated by the network interface 206 to the storage engine 210 as a confirmation message to indicate that the data of the object is received completely without any data loss or corruption. This calculated or generated check code may then be used by the storage system 102 (or the storage engine 210) for subsequent data integrity check (such as check code comparison) of the object. Additionally, in implementations, the network interface 206 may further send a message indicating that the payload data is successfully received to the client device 104.

In implementations, if determining that the payload data received from the client device 104 is not intact and is corrupted, the network interface 206 may send a message indicating that the payload data is not intact to the storage engine 210. Additionally, in implementations, the network interface 206 may further send a message indicating that the payload data received by the storage system 102 is corrupted to the client device 104. Additionally or alternatively, the network interface 206 may send a request for resending the payload data to the client device 104.

At block 304, the storage system 102 may generate a second check code for header data of the data to be stored, and add the first check code and the second check code to the header data to form a header of the data to be stored.

In implementations, if the payload data is successfully received by the network interface 206 (i.e., the payload data is intact and not corrupted), the storage system 102 (or the storage engine 210) may calculate or generate a check code (or called as a second check code) for original header data of the payload data (or the original metadata information of the payload data received from the client device 104). In implementations, the storage system 102 (or the storage engine 210) may employ a second check code generation method that may or may not be the same as the first check code generation method agreed between the client device 104 and the storage system 102. For example, the second check code generation method may employ a same algorithm as the first check code generation method with same or different parameters. For example, if the first check code and the second check code are CRC codes, the second check code generation method and the first check code generation method may be same or different CRC generation methods with same or different parameters (such as polynomial lengths, polynomial constants, etc.).

In implementations, upon calculating or generating the second check code for the original header data of the payload data, the storage system 102 (or the storage engine 210) may add the first check code and the second check code to the original header data (or the original metadata information) of the payload data to form a new header of the payload data. In implementations, if the original header data (or the original metadata information) of the payload data includes the first check code, the storage system 102 (or the storage engine 210) may only need to add the second check code to the original header data (or the original metadata information) of the payload data to form the new header of the payload data. In implementations, the storage system 102 (or the storage engine 210) may add the second check code (and the first check code if the original header or metadata information does not include the first check code) to unused fields of the original header data (or the original metadata information) of the payload data.

At block 306, the storage system 102 may separately generate a third check code for the header of the data to be stored and a fourth check code for padding data to be appended to the data to be stored.

In implementations, the storage system 102 (or the storage engine 210) may store the payload data (i.e., the data to be stored) into a storage device (such as the storage device 110 or the storage device 216). In implementations, the storage device may include, but is not limited to, a storage device that is configured to store data in units of logical blocks, with each logical block having a predefined or default size (e.g., 16 KB, 32 KB, etc.), and generate a respective check code (such as a CRC code or an error detecting code) for data stored in each logical block. Examples of the storage device may include high-speed non-volatile memory media such as a solid state device (SSD), a high-performance NUMA (Non-Uniform Memory Access) such as NVMe (Non-Volatile Memory Express), etc. Due to the nature of the storage device to which the payload data (i.e., the data to be stored) is to be stored, the storage system 102 (or the storage engine 210) may need to append padding data to the payload data. In implementations, the padding data may include data of all zero values (e.g., "0000" for padding data of a 4-bit size). In this case, the storage system 102 (or the storage engine 210) may need to append additional padding data to the payload data, to ensure that a total size of the additional padding data, the payload data, and other metadata (such as the new header of the payload data, and other check codes for logical blocks storing the payload data, etc.) is a multiple of a size of a logical block of the storage device.

In implementations, the storage system 102 (or the storage engine 210) may calculate or determine a size of the padding data based on the size of the payload data, a size of the new header of the payload data, and/or a size of additional metadata in a logical block of the storage device. In implementations, a size of additional metadata in a logical block may correspond to a size of a data space that is used for storing additional metadata associated with data stored in the logical block. By way of example and not limitation, the additional metadata associated with data stored in the logical block may include, but is not limited to, a check code generated by the storage device for data stored in that logical block.

In implementations, such data space in a logical block may be reserved or designed in advance for storing any additional metadata that is associated with data stored in the logical block, or may be designated by the storage system 102 (or the storage engine 210) for storing any additional metadata that is associated with data stored in the logical block. For example, the storage device may include an NVMe device, which includes a PI (Protect Info) area or space in each logical block. A PI area or space in a logical block of the NVMe device is configured to store a check code generated by the NVMe device for data stored in that logical block.

By way of example and not limitation, the storage system 102 (or the storage engine 210) may find a minimum integral number of logical blocks that can store the new header of the payload data, the payload data, and the data space of the reserved size in each logical block of the number of logical blocks, and take a remaining size (i.e., $m \times size_{logical\ block} - (size_{header} + size_{payload} + m \times size_{reserved})$) as the size of the padding data, where m is the minimum integral number of logical blocks, $size_{header}$ is the size of the new header of the payload data, $size_{payload}$ is the size of the payload data, $size_{reserved}$ is the reserved size in each logical block of a storage device, and $size_{logical\ block}$ is the size of each logical block. In implementations, the storage system 102 (or the storage engine 210) may further add information of the size of the padding data into the new header of the payload data.

In implementations, after forming the new header of the payload data and determining the size of the padding data, the storage system 102 (or the storage engine 210) may further calculate or generate a third check code for the new header of the payload data and a fourth check code for the padding data that is to be appended to the payload data. In implementations, the storage system 102 (or the storage engine 210) may employ a third check code generation method which may or may not be the same as the second check code generation method or the first check code generation method. In implementations, the third check code generation method may be preconfigured in advance. In implementations, the storage system 102 (or the storage engine 210) may temporarily store the third check code and the fourth check code into a memory or cache (such as the memory 208 of the storage system 102). FIG. 4 further shows example data components processed and/or generated by the storage engine 210. In this example, the data components processed and/or generated may include a new header 406 (which may include, but is not limited to, original metadata or header data 408, the payload check code 404, a metadata check code 410 (i.e., the second check code) for the original metadata or header data), the payload data 402, and padding data 412. The data processed and/or generated may further include a header check code 414 (i.e., the third check code) for the new header 406, and a padding check code 416 (i.e., the fourth check code) for the padding data 412 that are stored in the memory 208, for example, of the storage system 102 (or associated with the storage engine 210).

At block 308, the storage system 102 may write the header, the data, and the padding data into a plurality of logical blocks of a storage device.

In implementations, the storage system 102 (or the storage engine 210) may attempt to write or store the new header, the data, and the padding data into a plurality of logical blocks of the storage device. In implementations, the number of the plurality of logical blocks to which these pieces of data are written or stored corresponds to the minimum integral number of logical blocks that is obtained when calculating the size of the padding data. In implementations, the storage system 102 (or the storage engine 210) may attempt to write or store the new header, the data, and the padding data into the plurality of logical blocks of the storage device when (i.e., simultaneously at the same time when) or after the third check code and the fourth check code are calculated or generated.

In implementations, during a process of writing or storing a piece of data (i.e., a corresponding piece of the new header, the data, and/or the padding data) into a logical block of the plurality of logical blocks, the storage device may calculate or generate a corresponding check code for the piece of data written or stored in that logical block using a fourth check code generation method, and write or store the corresponding check code into the logical block (e.g., into a corresponding data space where additional metadata is written or stored as described in the foregoing description). In implementations, depending on an operating mode and/or an availability of processing capability of the storage device, the storage device may separately calculate and write (or store) a check code for a corresponding piece of data stored in a logical block of the plurality of logical blocks immediately after the corresponding piece of data is successfully stored in the logical block, while writing or storing another piece of data to another logical block of the plurality of logical blocks. Alternatively, the storage device may calculate and write (or store) respective check codes for corresponding pieces of data written or stored in the plurality of logical blocks only after all the corresponding pieces of data are successfully written or stored in the plurality of logical blocks. FIG. 4 further shows example data components written or stored in the storage device. In this example, the number of the plurality of logical blocks used for storing the payload data is assumed to be four. The storage device writes or stores corresponding portions or subsets of the payload data (i.e., payload data subsets 418, 420, 422, and 424) and check codes 426, 428, 430, and 432 in each of the logical blocks 434, 436, 438, and 440.

At block 310, the storage system 102 may compare a combination of the plurality of different block check codes with a combination of the first check code, the third check code and the fourth check code, and determine whether the header, the data, and the padding data are successfully stored into the plurality of logical blocks of the storage device based at least in part on a comparison result.

In implementations, the storage system 102 (or the storage engine 210) may receive a message or signal indicating that the attempt of writing or storing the data is completed from the storage device. In this case, the storage system 102 (or the storage engine 210) may determine whether the data is successfully written or stored in the storage device without data corruption or loss. In implementations, the storage system 102 (or the storage engine 210) may compare check codes generated and stored in the plurality of logical blocks of the storage device with check codes generated and/or received by the storage system 102 (or the storage engine 210) to determine whether the data is successfully written or stored in the storage device without data corruption or loss.

By way of example and not limitation, the storage system 102 (or the storage engine 210) may combine (e.g., concatenate) corresponding block check codes generated and written (or stored) in the plurality of logical blocks of the storage device to form a first combined code. In implementations, the storage system 102 (or the storage engine 210) may combine (e.g., concatenate) the corresponding block check codes in an order of storage. The storage system 102 (or the storage engine 210) may further combine (e.g., concatenate) the first check code (i.e., the check code for the payload data), the third check code (i.e., the check code for the new header of the payload data), and the fourth check code (i.e., the check code for the padding data) to form a second combined code. In implementations, the storage system 102 (or the storage engine 210) may combine (e.g., concatenate) these check codes in an order of the first check code, the fourth check code, and the third check code.

In implementations, the storage system 102 (or the storage engine 210) may then compare the first combined code with the second combined code, and determine whether the first combined code is identical to the second combined code. FIG. 4 further shows an example comparison between two combined or concatenated check codes 442 and 444 (i.e., the first combined code 442 and the second combined code 444).

In implementations, if the first combined code is identical to the second combined code, the storage system 102 (or the storage engine 210) may determine that the data is successfully stored in the storage device without data corruption or loss. In this case, the storage system 102 (or the storage engine 210) may send a message indicating that the payload data (i.e., the data to be stored) is successfully stored in the storage device to the client device 104 through the network interface 206. Additionally, the storage system 102 (or the storage engine 210) may further clear the third check code and the fourth code from the memory 208 after determining that the payload data is successfully stored. For example, the storage system 102 (or the storage engine 210) may mark or label data spaces storing the third check code and the fourth code as "deleted" or "available", to allow these data spaces to be used or reclaimed for subsequent uses.

Alternatively, if the first combined code is not identical to the second combined code, the storage system 102 (or the storage engine 210) may determine that the data written or stored in the storage device is corrupted or is not intact, i.e., writing or storing the data received from the client device 104 fails. In this case, the storage system 102 (or the storage engine 210) may perform a new attempt to write or store the data (i.e., the new header, the payload data, and the padding data, etc.) into the plurality of the logical blocks of the storage device. The storage device may calculate or generate new check codes for corresponding pieces of data written or stored in the plurality of logical blocks. The storage system 102 (or the storage engine 210) may perform a check code comparison as described in the foregoing description to determine whether the new attempt to write or store the data is successful or not. In implementations, the storage system 102 (or the storage engine 210) may repeat the above operations (i.e., data storage and check code comparison operations as described above) until the data is determined to be successfully written or stored in the storage device. Alternatively, the storage system 102 (or the storage engine 210) may determine that writing or storing the payload data fails after a predetermined number (such as two) of attempts of writing or storing the payload is reached. In this case, the storage system 102 (or the storage engine 210) may send a message indicating that writing or storing the payload data fails to the client device 104 through the network interface 206.

Referring back to FIG. 5, at block 502, the storage system 102 may receive a first check code for header data of payload data stored in a storage device.

In implementations, the storage system 102 (or the storage engine 210) may receive a request for reading data (or called as payload data hereinafter) of an object (such as a data file or record) in a storage device. The storage system 102 (or the storage engine 210) may receive the request from a client device (such as the client device 104) through the network interface 206. In implementations, upon receiving the request, the storage system 102 (or the storage engine 210) may read a check code (or called as a first check code hereinafter) for header data associated with the payload data from the storage device. FIG. 6 shows example data components of an object (such as a data file or record) stored in a storage device. In FIG. 6, the stored data components of the object may include data stored in a plurality of logical blocks (four logical blocks in this example), and may include a header 602 (which may include, but is not limited to, header data 604, a check code 606 for payload data and a check code 608 for the header data, etc.), corresponding parts 610, 612, 614, and 616 of payload data that are stored in the plurality of logical blocks, corresponding check codes 618, 620, 622, and 624 that are generated and stored in the plurality of logical blocks, and padding data 626.

At block 504, the storage system 102 may verify whether the header data is intact based on the first check code.

In implementations, the storage system 102 (or the storage engine 210) may verify whether the header data is intact and not corrupted based on the first check code. In implementations, the storage system 102 (or the storage engine 210) may obtain or read the header data associated with the payload data from the storage device, and calculate or generate a check code for the obtained header data using a same check code generation method (a CRC code generation method) that is used for obtaining the first check code. The storage system 102 (or the storage engine 210) may determine whether the calculated check code is the same as the first check code, and determine whether the header data is intact based on a determination result.

By way of example and not limitation, if the calculated check code is determined to be different from the first check code, the storage system 102 (or the storage engine 210) may determine that the header data is not intact and is corrupted. In this case, the storage system 102 (or the storage engine 210) may send a message indicating that the requested object (e.g., the data file or record) is corrupted to the client device 104 through the network interface 206.

In implementations, if the calculated check code is determined to be the same as the first check code, the storage system 102 (or the storage engine 210) may determine that the header data is intact and not corrupted. In this case, the storage system 102 (or the storage engine 210) may continue to perform additional error check operations for the payload data before sending the payload data to the client device 104.

At block 506, the storage system 102 may obtain a size of padding data from a header of the payload data and generate a second check code for the padding data.

In implementations, the storage system 102 (or the storage engine 210) may obtain or read information of a size of padding data that may have been appended to the payload data from a header of the payload data (or the object, such as data file or record). In implementations, due to the nature of the storage device (e.g., the storage device being a logical block based storage device as described above, etc.), padding data may have been appended after the payload data. In implementations, the padding data may include all zeros, and may have been appended to the payload data to ensure a total size of the header, the payload data, the padding data, and other block check codes (which are generated for data stored in corresponding logical blocks of the storage device) to be a multiple of a size of each logical block of the storage device.

In implementations, the header of the payload data (or the data file or record) may include, but is not limited to, header data, check codes (such as the first check code for the header data, a check code for the payload data, etc.) other than the header data, etc. In implementations, the storage system 102 (or the storage engine 210) may obtain or read information of the size of the padding data from the header data.

In implementations, the storage system 102 (or the storage engine 210) may calculate or generate a second check code for the padding data using a check code generation method (such as a CRC generation method, etc.) that may or may not be the same as the check code generation method used for obtaining the first check code as described at block 504.

At block 508, the storage system 102 may generate a third check code for the header of the payload data, and obtain a fourth check code for the payload data.

In implementations, before, when or after the storage system 102 may obtain the size of the padding data from the header of the payload data and generate the second check code for the padding data, the storage system 102 may generate a third check code for the header of the payload data, and obtain a fourth check code for the payload data. In implementations, the storage system 102 (or the storage engine 210) may calculate or generate a third check code for the header of the payload data, and calculate or generate a fourth check code for the payload data using same or different check code generation methods (e.g., same or different CRC generation methods with same or different parameters such as same or different polynomial constants, same or different polynomial lengths, etc.) that may or may not be the same as the check code generation method used for obtaining the first check code as described at block 504 or the check code generation method used for obtaining the second check code as described at block 506.

At block 510, the storage system 102 may compare a plurality of different block check codes stored with corresponding pieces of the payload data in a plurality of logical blocks of the storage device with a combination of the second check code, the third check code, and the fourth check code.

In implementations, the storage device may also store check codes (or called as block check codes) that are generated for corresponding parts of the header of the payload data, the payload data, and the padding data, when the header of the payload data, the payload data, and the padding data are stored in a plurality of logical blocks of the storage device. In implementations, the storage system 102 (or the storage engine 210) may compare these block check codes stored in the plurality of logical blocks of the storage device with a combination of the fourth check code, the second check code, and the third check code.

By way of example and not limitation, the storage system 102 (or the storage engine 210) may combine (e.g., concatenate) these different block check codes to form a first combined code, and combine (e.g., concatenate) the second check code, the third check code, and the fourth check code to form a second combined code. In implementations, the storage system 102 (or the storage engine 210) may combine (e.g., concatenate) the corresponding block check codes in an order of storage. The storage system 102 (or the storage engine 210) may further combine (e.g., concatenate) the second check code (i.e., the check code for the padding data), the third check code (i.e., the check code for the header of the payload data), and the fourth check code (i.e., the check code for the payload data) to form a second combined code. In implementations, the storage system 102 (or the storage engine 210) may combine (e.g., concatenate) these check codes in an order of the fourth check code, the second check code, and the third check code.

In implementations, the storage system 102 (or the storage engine 210) may then determine whether the first combined code is identical to the second combined code to determine whether data (i.e., the header of the payload data, the payload data, and the padding data) is successfully obtained or read from the storage device without data corruption or loss (i.e., the obtained or read data is intact and is not corrupted).

In implementations, if the first combined code is identical to the second combined code, the storage system 102 (or the storage engine 210) may determine that the data is successfully obtained or read from the storage device without data corruption or loss, and the storage system 102 (or the storage engine 210) may transmit the payload data and the check code (i.e., the fourth check code) for the payload data to the client device 104 through the network interface 206.

Alternatively, if the first combined code is identical to the second combined code, the storage system 102 (or the storage engine 210) may determine that the obtained or read data is not intact or is corrupted. In this case, the storage system 102 (or the storage engine 210) may attempt to read the data of the data file or record again from the storage device, and perform the operations as described above until the data of the data file or record is successfully obtained or read from the storage device, or until a predetermined number (e.g., two) of attempts is reached. If the data of the data file or record is successfully obtained or read from the storage device, the storage system 102 (or the storage engine 210) may transmit the payload data and the check code (i.e., the fourth check code) for the payload data to the client device 104 through the network interface 206. Otherwise, if the predetermined number (e.g., two) of attempts is reached and the obtained or read data of the data file or record is still determined to be corrupted or not intact, the storage system 102 (or the storage engine 210) may send a message indicating that a data retrieval fails to the client device 104. In some instances, the storage system 102 (or the storage engine 210) may also send a message to an administrator, and request a manual or systematic examination of the storage device to determine if the storage device has encountered a memory failure.

FIG. 6 further shows example data components used for integrity check (or check code comparison) of the data obtained or read from the storage device. For example, during the integrity check, the storage system 102 (or the storage engine 210) may compare the check codes 618, 620, 622, and 624 with the check code 606 for the payload data, a check code 628 generated for the padding data, and a check code 630 for the header. FIG. 6 also shows example data components processed by the storage engine 210, which includes the header data 604, the check code 606 for the payload data, the check code 608 for the header data, the entire payload data 632, and the padding data 626, after the data obtained or read from the storage device is determined to be intact and not corrupted. FIG. 6 also shows example data components to be transmitted by the network interface 206, which includes the entire payload data 632 and the check code 606 for the payload data 632.

Although the acts of the above methods 400 and 600 are described in certain orders, some of the acts of any of the above methods 400 and 600 may be performed in an order different from those described herein or may be performed in parallel. For example, the storage system 102 may generate a third check code for the header of the payload data at block 608, and obtain a fourth check code for the payload data before obtaining a size of padding data from a header of the payload data and generating a second check code for the padding data at block 606. Alternatively, the storage system 102 may generate a third check code for the header of the payload data at block 608, and obtain a fourth check code for the payload data at the same time when the storage system 102 obtains a size of padding data from a header of the payload data and generates a second check code for the padding data at block 606.

Any of the acts of any of the methods described herein may be implemented at least partially by a processor or other electronic device based on instructions that are stored on one or more computer-readable media. By way of example and not limitation, any of the acts of any of the methods described herein may be implemented under control of one or more processors configured with executable instructions that may be stored on one or more computer-readable media.

CONCLUSION

Although implementations have been described in language specific to structural features and/or methodological acts, it is to be understood that the claims are not necessarily limited to the specific features or acts described. Rather, the specific features and acts are disclosed as exemplary forms of implementing the claimed subject matter. Additionally or alternatively, some or all of the operations may be implemented by one or more ASICS, FPGAs, or other hardware.

The present disclosure can be further understood using the following clauses.

Clause 1: A method implemented by one or more processors, the method comprising: receiving incoming data and a first check code for the incoming data from a network adapter; generating a second check code for header data of the incoming data, and adding the first check code and the second check code to the header data to form a header of the incoming data; separately generating a third check code for the header of the incoming data and a fourth check code for padding data to be appended to the incoming data; and storing the header, the incoming data, and the padding data into a plurality of logical blocks of a storage device.

Clause 2: The method of Clause 1, wherein the storage device is configured to generate a plurality of different block check codes respectively for corresponding pieces of the header, the incoming data and the padding data stored in the plurality of logical blocks.

Clause 3: The method of Clause 2, further comprising: comparing a combination of the plurality of different block check codes with a combination of the first check code, the third check code and the fourth check code; and determining whether the storing is successful based at least in part on a result of the comparing.

Clause 4: The method of Clause 3, wherein comparing the combination of the plurality of different block check codes with the combination of the first check code, the third check code and the fourth check code comprises: concatenating the plurality of different block check codes to form a first combined code; concatenating the first check code, the third check code and the fourth check code to form a second combined code; and comparing the first combined code with the second combined code.

Clause 5: The method of Clause 4, wherein determining that the storing is successful in response to determining that the first combined code is identical to the second combined code.

Clause 6: The method of Clause 1, wherein the first check code for the incoming data is generated by the network adapter or a source from which the incoming data is sent.

Clause 7: The method of Clause 1, further comprising determining a size of the padding data based on at least in part on a size of the incoming data and a size of each logical block of the storage device.

Clause 8: The method of Clause 1, further comprising: temporarily storing the third check code and the fourth code in a memory of the storage engine, the memory being different from the storage device; and clearing the third check code and the fourth code from the memory after determining that the storing is successful.

Clause 9: The method of Clause 1, wherein the storage device comprises a device that is configured to store data in units of logical blocks.

Clause 10: The method of Clause 1, wherein the second check code, the third check code, and the fourth check code are generated by a cyclic redundancy check (CRC) generation method with a same polynomial constant or different CRC generation methods having different polynomial constants.

Clause 11: One or more processor readable media storing executable instructions that, when executed by one or more processors, cause the one or more processors to perform acts comprising: receiving a first check code for header data of payload data stored in a storage device; verifying whether the header data is intact; obtaining a size of padding data from a header of the payload data and generating a second check code for the padding data in response to verifying that the header data is intact; generating a third check code for the header of the payload data, and obtaining a fourth check code for the payload data; and comparing a plurality of different block check codes stored with corresponding pieces of the payload data in a plurality of logical blocks of the storage device with a combination of the fourth check code, the second check code, and the third check code.

Clause 12: The one or more processor readable media of Clause 11, the acts further comprising determining an integrity of at least the payload data based on a result of the comparing.

Clause 13: The one or more processor readable media of Clause 12, the acts further comprising transmitting the payload data and the fourth check code to another device through a network adapter in response to determining the integrity of at least the payload data.

Clause 14: The one or more processor readable media of Clause 11, wherein comparing the plurality of different block check codes with the combination of the fourth check code, the second check code, and the third check code comprises: concatenating the plurality of different block check codes to form the first combined code; concatenating the fourth check code, the second check code, and the third check code to form a second combined code; and comparing the first combined code with the second combined code.

Clause 15: The one or more processor readable media of Clause 11, wherein verifying whether the header data is intact comprises: generating a check code for the header data based on a cyclic redundancy check (CRC) generation method; and comparing the generated check code for the header data with the first check code.

Clause 16: The one or more processor readable media of Clause 11, wherein the padding data comprises all zeros, and has been appended to the payload data to ensure a total size of the header, the payload data, the padding data, and the plurality of block check codes to be a multiple of a size of each logical block of the storage device.

Clause 17: The one or more processor readable media of Clause 11, wherein the storage device comprises a device that is configured to store data in units of logical blocks.

Clause 18: The one or more processor readable media of Clause 11, wherein the second check code, the third check code, and the fourth check code are generated by a cyclic redundancy check (CRC) method with a same polynomial constant or different CRC methods having different polynomial constants.

Clause 19: A system comprising: one or more processors; and memory storing executable instructions that, when executed by the one or more processors, cause the one or more processors to perform acts comprising: receiving incoming data and a first check code for the incoming data from a network adapter; generating a second check code for header data of the incoming data, and adding the first check code and the second check code to the header data to form a header of the incoming data; separately generating a third check code for the header of the incoming data and a fourth check code for padding data to be appended to the incoming data; storing the header, the incoming data, and the padding data into a plurality of logical blocks of a storage device; comparing a combination of the plurality of different block check codes with a combination of the first check code, the third check code and the fourth check code; and determining whether the storing is successful based at least in part on a result of the comparing.

Clause 20: The system of Clause 19, wherein comparing the combination of the plurality of different block check codes with the combination of the first check code, the third check code and the fourth check code comprises: concatenating the plurality of different block check codes to form a first combined code; concatenating the first check code, the third check code and the fourth check code to form a second combined code; and comparing the first combined code with the second combined code, wherein determining that the storing is successful in response to determining that the first combined code is identical to the second combined code.

What is claimed is:

1. A method implemented by one or more processors, the method comprising:
   receiving incoming data and a first check code for the incoming data from a network adapter;
   generating a second check code for header data of the incoming data, and adding the first check code and the second check code to the header data to form a header of the incoming data;
   separately generating a third check code for the header of the incoming data and a fourth check code for padding data, the padding data to be appended to the incoming data; and
   storing the header, the incoming data, and the padding data into a plurality of logical blocks of a storage device.

2. The method of claim 1, wherein the storage device is configured to generate a plurality of different block check codes respectively for corresponding pieces of the header, the incoming data and the padding data stored in the plurality of logical blocks.

3. The method of claim 2, further comprising:
   comparing a combination of the plurality of different block check codes with a combination of the first check code, the third check code and the fourth check code; and
   determining whether the storing is successful based at least in part on a result of the comparing.

4. The method of claim 3, wherein comparing the combination of the plurality of different block check codes with the combination of the first check code, the third check code and the fourth check code comprises:
   concatenating the plurality of different block check codes to form a first combined code;
   concatenating the first check code, the third check code and the fourth check code to form a second combined code; and
   comparing the first combined code with the second combined code.

5. The method of claim 4, wherein determining that the storing is successful in response to determining that the first combined code is identical to the second combined code.

6. The method of claim 1, wherein the first check code for the incoming data is generated by the network adapter or a source from which the incoming data is sent.

7. The method of claim 1, further comprising determining a size of the padding data based on at least in part on a size of the incoming data and a size of each logical block of the storage device.

8. The method of claim 1, further comprising:
   temporarily storing the third check code and the fourth code in a memory of a storage engine, the memory being different from the storage device; and
   clearing the third check code and the fourth code from the memory after determining that the storing is successful.

9. The method of claim 1, wherein the storage device comprises a device that is configured to store data in units of logical blocks.

10. The method of claim 1, wherein the second check code, the third check code, and the fourth check code are generated by a cyclic redundancy check (CRC) generation method with a same polynomial constant or different CRC generation methods having different polynomial constants.

11. One or more non-transitory media storing executable instructions that, when executed by one or more processors, cause the one or more processors to perform acts comprising:

receiving a first check code for header data of payload data stored in a storage device;

verifying whether the header data is intact;

obtaining a size of padding data from a header of the payload data and generating a second check code for the padding data in response to verifying that the header data is intact;

generating a third check code for the header of the payload data, and obtaining a fourth check code for the payload data; and comparing a plurality of different block check codes stored with corresponding pieces of the payload data in a plurality of logical blocks of the storage device with a combination of the fourth check code, the second check code, and the third check code.

12. The one or more non-transitory media of claim 11, the acts further comprising determining an integrity of at least the payload data based on a result of the comparing.

13. The one or more non-transitory media of claim 12, the acts further comprising transmitting the payload data and the fourth check code to another device through a network adapter in response to determining the integrity of at least the payload data.

14. The one or more non-transitory media of claim 11, wherein comparing the plurality of different block check codes with the combination of the fourth check code, the second check code, and the third check code comprises:

concatenating the plurality of different block check codes to form the first combined code;

concatenating the fourth check code, the second check code, and the third check code to form a second combined code; and comparing the first combined code with the second combined code.

15. The one or more non-transitory media of claim 11, wherein verifying whether the header data is intact comprises:

generating a check code for the header data based on a cyclic redundancy check (CRC) generation method; and comparing the generated check code for the header data with the first check code.

16. The one or more non-transitory media of claim 11, wherein the padding data comprises all zeros, and has been appended to the payload data to ensure a total size of the header, the payload data, the padding data, and the plurality of block check codes to be a multiple of a size of each logical block of the storage device.

17. The one or more non-transitory media of claim 11, wherein the storage device comprises a device that is configured to store data in units of logical blocks.

18. The one or more non-transitory media of claim 11, wherein the second check code, the third check code, and the fourth check code are generated by a cyclic redundancy check (CRC) method with a same polynomial constant or different CRC methods having different polynomial constants.

19. A system comprising:

one or more processors; and memory storing executable instructions that, when executed by the one or more processors, cause the one or more processors to perform acts comprising:

receiving incoming data and a first check code for the incoming data from a network adapter;

generating a second check code for header data of the incoming data, and adding the first check code and the second check code to the header data to form a header of the incoming data;

separately generating a third check code for the header of the incoming data and a fourth check code for padding data, the padding data to be appended to the incoming data;

storing the header, the incoming data, and the padding data into a plurality of logical blocks of a storage device;

comparing a combination of a plurality of different block check codes with a combination of the first check code, the third check code and the fourth check code; and determining whether the storing is successful based at least in part on a result of the comparing.

20. The system of claim 19, wherein comparing the combination of the plurality of different block check codes with the combination of the first check code, the third check code and the fourth check code comprises:

concatenating the plurality of different block check codes to form a first combined code;

concatenating the first check code, the third check code and the fourth check code to form a second combined code; and comparing the first combined code with the second combined code, wherein determining that the storing is successful in response to determining that the first combined code is identical to the second combined code.

* * * * *